UNITED STATES PATENT OFFICE.

CARL D. EKMAN, OF LONDON, ENGLAND.

METHOD OF TREATING WOOD IN ORDER TO OBTAIN FIBER SUITABLE FOR PAPER-MAKING

SPECIFICATION forming part of Reissued Letters Patent No. 10,131, dated June 6, 1882.

Original No. 253,357, dated February 7, 1882. Application for reissue filed May 11, 1882. Patented in England July 13, 1881, No. 3,062; in France November 10, 1881, and in Belgium November 12, 1881

*To all whom it may concern:*

Be it known that I, CARL DANIEL EKMAN, of Old Broad Street, in the city of London, England, have invented a new and Improved Method of Treating Wood in Order to Obtain Fiber Suitable for Paper-Making, &c., (for which I have obtained Letters Patent of Great Britain, No. 3,062, dated July 13, 1881, a brevet of France, dated November 10, 1881, and a brevet of Belgium, dated November 12, 1881,) of which the following is a description.

My invention has for its object the production from wood of a fiber or fibers suitable for paper-making and for other purposes; and the process by which the object is accomplished consists in boiling wood under pressure with a solution containing sulphurous acid and magnesia, and in allowing to escape from time to time during the boiling process any sulphurous acid which is set free, and which would be if confined converted into sulphuric acid. Potash and soda may also be employed instead of magnesia; but I prefer to use magnesia, as being more economical and having chemical properties which render it peculiarly suitable, and therefore the invention will be described with especial reference to the use of magnesia.

It will be convenient to describe the process as applied to Swedish white fir of good quality and fine grain, previously freed from bark and knots and cut into pieces of suitable form and size—say of half to three-quarters of an inch long—and subsequently crushed between rollers, so as to render the wood easily permeable by the liquid solution, in order to produce fiber of the best quality for paper-making; but the mode of preparation may be varied. White fir and trees of the same order are especially suitable, as they give long and strong fiber, very clean, and similar in its properties for paper-making to that of flax, and this kind of wood is comparatively cheap and abundant in many countries. The suitableness of other kinds of wood for the purpose depends much upon the length and properties of its fiber, as well as on the facility or difficulty found in dissolving the incrusting matter, so that in the selection of wood much will depend on the purpose for which the pulp is required; but in general that wood which is very resinous is avoided because of the difficulty found in dissolving the incrusting matter sufficiently to obtain good cellulose. The raw material of wood is selected with more or less care, according to the purpose for which it is required; but when a superior quality of pulp has to be produced all exceptionally resinous and hard pieces of wood, as well as those damaged by rot, are to be thrown out. Wood in small pieces, thus prepared, (and if necessary duly sorted,) is put into a jacketed boiler lined with lead or a suitable compound thereof, and mounted on trunnions for the convenience of filling and emptying. The boiler may be vertical and cylindrical, of about four feet diameter inside and twelve feet between the two ends. The wood is put into the boiler until it is within about two feet and the solution to within about four inches of the top end of the boiler; but the quantity of wood is limited only by the condition that it should be completely covered with the solution during the whole boiling process.

In the preparation of the boiling liquid or solution the proportions between the sulphurous acid and the magnesia found to be most advantageous are about two equivalents of the former to one of the latter, or approximately those which go to form the salt commonly called "bisulphite of magnesia." The strength of the solution is such that it contains approximately one and four-tenths per cent. of magnesia and four and four-tenths per cent. of sulphurous acid. The boiler is filled with this solution to such an extent that while the wood is perfectly covered by it there is yet sufficient room left in the upper part to form a steam-space. The wood is prevented from rising above the liquid during the boiling by the pressure thereon of a perforated leaden plate. After the boiler has been charged with wood and the solution under the conditions stated a cover is bolted on and made tight by ordinary means. Steam of from ten to fifteen pounds pressure on the square inch is now passed gradually into the jacket of the boiler, the condensed water returning into the generating-boiler in the usual way. When the pressure in the boiler itself (not the jacket) begins to exceed five pounds to the square inch a valve placed at the highest part of the boiler for the purpose is opened, so that a small quantity of gas and steam escapes. By this means the sulphurous acid which has been set free by the action of heat, and which, if confined within the boiler would be subsequently converted into sulphuric acid, and would blacken the wood undergoing treatment, is allowed to be discharged.

The pressure of steam in the jacket is gradually increased as the steam-pressure is seen to rise in the boiler itself, and it is preferred that the pressure in the jacket should not exceed that in the boiler by more than thirty pounds per square inch. As the pressure in the boiler increases more gas and steam are allowed to escape from the before-named valve, the object being to prevent the burning or discoloration of the wood during the operation.

For boilers of the size above referred to, the boiling is or may be conducted so that after two hours the pressure in the inner boiler is ten pounds, and this is increased twenty pounds per hour for the two following hours, in the next hour fifteen pounds, and in each of the two following hours ten pounds. When the pressure has reached eighty-five or ninety pounds per square inch, or thereabout, the boiler is allowed to remain at that pressure for from one to three hours, the completion of the operation being indicated by the smell. In case of any burning or discoloration taking place, (which is easily detected by the odor emitted or by the color of the liquid,) steam is blown off, the mass turned out of the boiler, and water thrown on it; but if there be no sign of burning the mass may remain in the boiler for some time after steam has been blown off. The cover is then taken off, the boiler turned on its trunnions, and the fiber strained off from the liquor. The fiber is washed and beaten in the usual manner, and the liquor may be treated in any suitable way in order to obtain a gummy matter, which for some purposes may be used as a substitute for ordinary dextrine, also to obtain other useful products or for the recovery of the chemicals.

If it be desired to obtain a fiber less approaching pure cellulose, by dissolving a smaller part of the incrusting matter of the wood a weaker solution and lower pressure may be used. The solution employed may also be varied to a considerable extent, it being understood, as a general rule, that if the salt be more basic than that above described, the incrusting matter will be less completely dissolved, and if more acid (and waste is to be avoided) there is more liability to burning. The pressure above indicated may in some cases be varied.

The completion of the boiling operation has, in the foregoing description, been fixed at about eighty-five to ninety pounds pressure, because good results may be relied upon within this limit, and for practical purposes increase of pressure beyond this point may be attended with disadvantage economically; but I do not confine myself to this limit, because good results have been obtained at a pressure up to one hundred and ten pounds, and even above this.

The fiber resulting from the above treatment of the wood is suitable for good ordinary printing-paper, and may be made suitable for superior paper by means of treatment with bleaching powder; and the resulting solution of an amber color contains a large quantity of gummy matter resembling ordinary dextrine and other incrusting and soluble matters which the wood contained, and which may be made more or less available for commercial purposes. The resulting fiber may be suitable for coarser kinds of paper, mill-boards, papier-maché, and similar materials, even if the separation of the cellulose from the incrusting and other matter has not been so complete as above described.

The invention can be easily applied to other kinds of wood besides the white fir described by modifying the process according to the product required and the wood used, the quality of the fiber obtained depending upon the suitableness of the wood and the other above-named conditions. If the wood is very resinous, (although its original fiber may be good,) the resulting material may only be useful for the coarser kinds of paper and similar materials, owing to the difficulty of removing the incrusting matter.

The peculiar character of the invention will be better understood by considering the advantages possessed by it over the usual method, in which caustic soda is employed. Instead of using caustic soda, chemicals are employed which have a far less damaging effect on the fibers, and which, especially when magnesia is used, are much cheaper.

In boiling with caustic soda the separation of the fiber from the incrusting matter depends, as is well known, on such matter being rendered soluble by oxidation; but it is impossible to prevent the fibers themselves from being also oxidized to some extent, thereby weakening and partially destroying them, and diminishing the quantity of pulp yielded by the wood. On the other hand, in the preparation of pulp according to my invention no oxidation of the fiber can occur when the operation is properly conducted and the incrusting matter obtained is in the form of a gummy matter of commercial value, instead of being converted, as by the old method, into worthless products of the humus type.

Another advantage is that the boiling can be done at about half the pressure required by the usual method, which is of great importance in practice. Besides that the fiber is less liable to be weakened in the process.

A third advantage is that by this method fiber can be prepared which, without any further chemical treatment, is sufficiently white to be used for ordinary kinds of paper, and is capable of supplying a strong good paper without admixture of other fiber. After a subsequent treatment with bleaching-powder it is made suitable for the manufacture of all the finer kinds of paper. This fiber much resembles linen in its physical and chemical properties for paper-making, and is therefore a very valuable material for this purpose.

A fourth advantage is that the solution which remains after boiling contains a gum-like substance, which at a small cost can be made to serve as a substitute for dextrine for many purposes, and thereby produce economy in the manufacture. Some portion also of the chemicals used in the solution may be recovered.

A further advantage consists in avoiding the injurious effect on vegetation and on animal life produced, as is well known, by spent-soda lye resulting from the ordinary method or process; and, lastly, cellulose of good quality can be prepared at a comparatively low cost by the process hereinbefore described.

What I claim as an improvement in the method of treating wood in order to obtain fiber or pulp suitable for paper-making, and desire to secure by Letters Patent as a new process, is—

1. The boiling of wood under pressure in a solution containing sulphurous acid and magnesia, substantially as hereinbefore described.

2. The boiling of wood under pressure in a solution containing sulphurous acid and magnesia, or alkaline substitutes, as specified, and discharging from time to time from the boiler during the boiling operation the sulphurous acid that is set free in the process.

3. The boiling of wood in a solution containing sulphurous acid and magnesia, or other alkaline substitutes, as specified, during successive periods in a close vessel, under pressures, which are increased for the several periods, substantially as described, until the wood is reduced to pulp-fiber, and discharging from time to time from the boiler during the boiling periods the sulphurous acid that is set free in the process, as set forth.

CARL DANIEL EKMAN.

Witnesses:

W. H. THURSTON,
I. KNIGHT.